April 2, 1946.   H. W. DIETERT   2,397,845
APPARATUS FOR ANALYSIS OF GAS
Filed Oct. 4, 1943
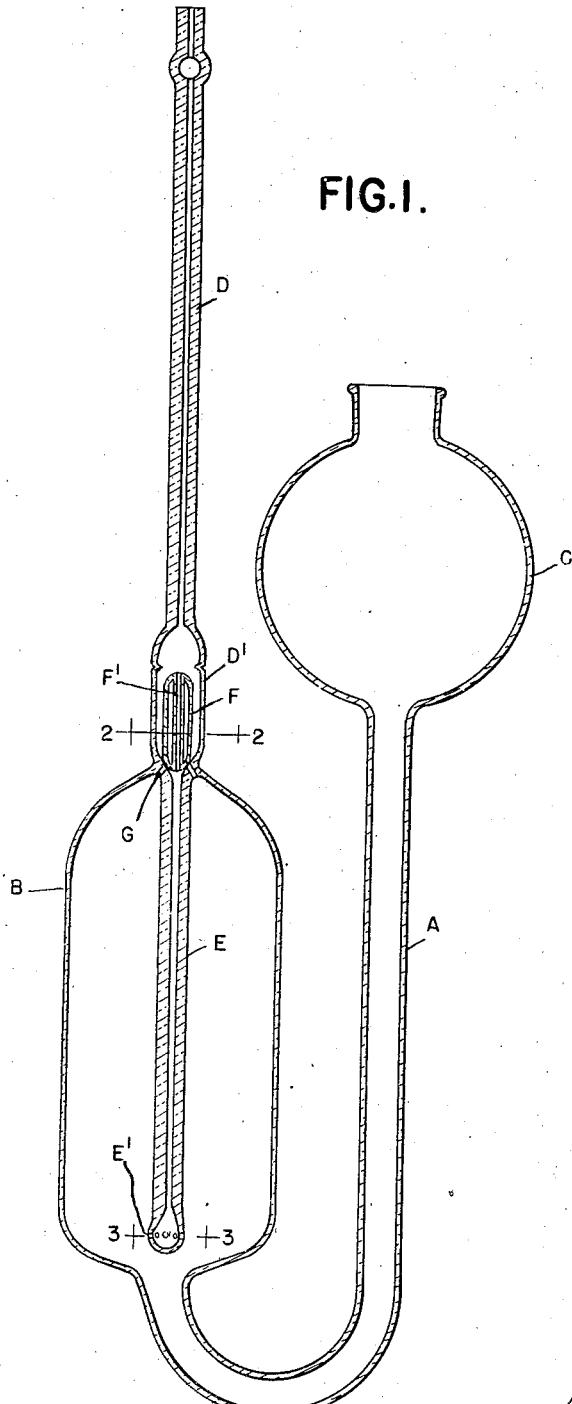
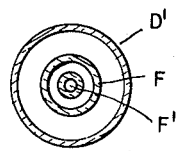
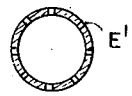
INVENTOR.
HARRY W. DIETERT
ATTORNEYS Patented Apr. 2, 1946

2,397,845

UNITED STATES PATENT OFFICE 2,397,845

APPARATUS FOR ANALYSIS OF GAS

Harry W. Dietert, Detroit, Mich.

Application October 4, 1943, Serial No. 504,947

3 Claims. (Cl. 23—292)

The invention relates to apparatus for the analysis of gas and of that type in which certain constituents of a gaseous mixture are removed by absorption. More particularly, the invention relates to the absorption means and consists in the novel construction as hereinafter set forth.

In the drawing:

Fig. 1 is a vertical central section through the apparatus;

Fig. 2 is a cross section on line 2—2, Fig. 1; and

Fig. 3 is a section on line 3—3, Fig. 1.

In the quantitive analysis of gaseous mixtures such, for instance, as in a step of the process for determining the carbon content of material, it is necessary to absorb one constituent (carbon dioxide—$CO_2$) and to measure the gaseous volume before and after absorption. The accuracy of the determination is dependent upon the complete absorption of the one ingredient without loss of other constituents. Also it is essential that the pressure of the gas should be the same during each volumetric measurement. To accomplish this result, I have devised a simple form of absorption apparatus of the following construction. A is a U-tube having formed in one leg thereof an expansion portion B constituting a container for a liquid absorption material. In the other leg is an expansion portion C forming a displacement chamber of sufficient volume to receive the liquid from the container B. D is a gas conduit preferably a capillary tube which extends downward from above the container B and is connected to the upper end thereof. E is an extension of the conduit D which passes downward through the container B to a point near the lower end thereof where it is provided with a series of jet openings E'. Eccentric to the conduit E is a gas connection to the conduit D controlled by a check valve F which latter prevents direct downward passage of gas from said conduit into the upper portion of the container while permitting reverse flow of gas through said connection. As specifically shown, the conduit D has an expansion portion D' for receiving the check valve F, which valve has extending centrally therethrough a passage F'' establishing gaseous communication between the tubes D and E. The eccentric gas connection is formed by a circular series of ports G which are positioned to be closed by the check valve F when the latter is in engagement with its seat.

With the construction as described, the upper end of the conduit D is adapted to be connected with a burette (not shown) from which it receives the gaseous mixture and conveys the same downward into the container B. The pressure on the gas which is developed by manipulation of the usual leveling bottle (not shown) is sufficient to displace the liquid in the conduit E and to pass it through the ports E' where it will bubble upward through the liquid in the container B. This liquid is a suitable absorption material of which, for instance, as a solution of potassium hydroxide (KOH) for the absorption of $CO_2$. Consequently, the small bubbles of gas passing upward through the liquid will be robbed of their $CO_2$ content and only the residual gas will collect in the upper portion of the container B. This will progressively displace the liquid from the container forcing it upward against hydrostatic pressure into the receptacle C. After a measured volume of gas is ejected from the burette and forced into the container B, the pressure on the gas is reduced so that the hydrostatic pressure of the liquid in the container C will force it backward into the container B displacing the gas therefrom through the ports G unseating the valve F and entering the conduit D. This continues until the container B is again filled with liquid after which the displaced gas returned to the burette is again measured to determine the differential volume.

The whole apparatus may be formed of glass and, as there are no joints, it is impossible for any of the gas to escape. Also, the small size of the ports E' through which the gas passes into the liquid will form correspondingly small bubbles from which the constituent to be removed will be entirely absorbed before reaching the upper end of the chamber. A portion of the tube D above the enlargement D' may be used as a gauge for marking the level of liquid therein so that the gas within the burette may be placed at the same pressure during the measurement before and after the absorption of the $CO_2$ content.

What I claim as my invention is:

1. A gas absorption apparatus comprising a U-tube having in one leg an enlargement forming a container for an absorption liquid and in the other leg a displacement receptacle, a gas conduit extending from above said container downward therethrough and discharging within the lower end portion thereof, said conduit having an enlarged chamber therein above and adjacent to said container and ports connecting the latter with said chamber said ports being in the portion of said conduit which is within said container, and a check valve in said chamber for closing said ports against downward movement of gas therethrough said check valve having a passage therethrough connecting said chamber with the portion of said conduit within said container.

2. A gas absorption apparatus comprising a U-tube having formed in one leg thereof a container for the absorption liquid and in the other leg a displacement chamber, an upper gas conduit extending downward from above said container and connected to the upper end thereof, said conduit having an enlarged portion adjacent to said container, a lower conduit extending downward centrally within said container to a point near the lower end thereof and provided with one or more discharge apertures near its lower end, the upper end of said lower conduit being in communication with said enlarged portion, one or more ports in said lower conduit connecting the upper end of said container with said enlarged portion, and a check valve in said enlarged portion adapted when seated to close said ports, said valve having a central open passage therethrough connecting said upper and lower conduits.

3. A gas absorption apparatus comprising a U-tube having in one leg an enlargement forming a container for an absorption liquid and in the other leg a displacement receptacle, a gas conduit extending from above said container downward to the top thereof and having a continuing lower portion within said container and terminating adjacent the bottom thereof, said conduit being provided at the top of said container with an enlarged chamber, the lower portion of said conduit being provided at its lower end within said container with one or more discharge openings and provided at the top of said container with one or more ports connecting said container with said chamber, and a check valve in said chamber for closing said ports against downward movement of gas therethrough, said check valve having a passage therethrough connecting said chamber with the lower portion of said conduit within said container.

HARRY W. DIETERT.